United States Patent Office 3,501,457
Patented Mar. 17, 1970

3,501,457
PROCESS FOR RENDERING CELLULOSIC
MATERIAL FIRE RETARDANT
William J. Farrissey, Jr., North Branford, Francesco P. Recchia, New Haven, and Adnan A. R. Sayigh, North Haven, Conn., assignors to The Upjohn Company, Kalamazoo, Mich., a corporation of Delaware
No Drawing. Continuation-in-part of application Ser. No. 478,737, Aug. 10, 1965. This application Dec. 11, 1968, Ser. No. 783,147
Int. Cl. C08b *15/06, 27/72;* D06m *13/42*
U.S. Cl. 260—212                                                           4 Claims

ABSTRACT OF THE DISCLOSURE

Cellulosic material (especially cotton) is rendered fire retardant by reaction with 2 to 15% by weight of a halogenated isocyanate having the formula:

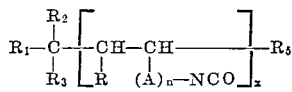

where
R=H, alkyl, isocyanatoalkyl
$R_1$ and $R_5$=Cl or Br
$R_2$ and $R_3$=Cl, Br, CN, alkoxycarbonyl
A=lower-alkylene or arylene
$n$=0 or 1
$x$=1, 2, or 3

CROSS-REFERENCE TO RELATED APPLICATIONS

This application is a continuation-in-part of our copending application Ser. No. 478,737, filed Aug. 10, 1965, now U.S. Patent No. 3,437,680, issued Apr. 8, 1969.

BACKGROUND OF THE INVENTION

This invention relates to novel isocyanates and is more particularly concerned with halogen-substituted aliphatic, araliphatic, and aromatic mono- and polyisocyanates and with processes for their preparation, and with novel fire retardant polyurethanes produced therefrom.

The preparation of halogenated hydrocarbyl isocyanates has been described previously. For example, mono- and polyhaloaliphatic isocyanates have been prepared by direct halogenation as described in French Patent 1,304,- 206; polyhalo-α-hydroxyaliphatic isocyanates have been prepared by condensing polyhalo aldehydes and ketones with isocyanic acid as described in U.S. Patent 3,040,082.

Halogen containing isocyanates are useful as intermediates for a variety of purposes, illustratively in the preparation of polyurethanes as will be described in more detail below. The incorporation of a halogen containing isocyanate into the polyurethane structure increases the fire retardant properties of the latter. In the case of halogenated monoisocyanates only a limited amount of said isocyanate can be incorporated into the polyurethane structure since the monoisocyanate acts as chain terminator but in the case of halogenated di- and polyisocyanates a part or all of the polyisocyanate ordinarily used to prepare the polyurethane can be replaced by halogenated polyisocyanate. The degree of fire retardance imparted to a polyurethane in this way is related approximately to the proportion of halogen incorporated therein and hence it is desirable to be able to provide isocyanates containing as high a percentage of halogen as possible.

It is an object of this invention to produce mono and polyisocyanates which contain a high proportion of halogen. It is also an object of this invention to provide a novel process for the preparation of such compounds. It is a further object of this invention to provide novel fire retardant polyurethane compositions which are derived from halogenated mono and polyisocyanates prepared according to the process of the invention.

The novel process of the invention comprises reacting, in the presence of a free radical source, an unsaturated isocyanate having the formula:

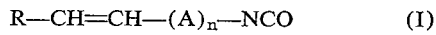

wherein R is selected from the group consisting of hydrogen, lower-alkyl and lower-isocyanatoalkyl, A is a divalent radical selected from the group consisting of lower-alkylene and arylene, and $n$ is an integer from 0 to 1, with a haloalkane having the formula:

wherein $R_1$ is selected from the group consisting of chlorine and bromine, $R_2$ and $R_3$ are each selected from the group consisting of chlorine, bromine, cyano, and lower-alkoxycarbonyl, and $R_4$ is selected from the group consisting of bromine and sulfonylchloride, to obtain a compound having the formula:

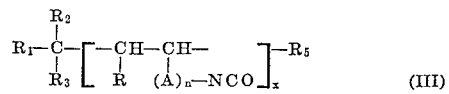

wherein R, $R_1$, $R_2$, $R_3$, A and N are defined above, $R_5$ is selected from the group consisting of chlorine and bromine and $x$ is an integer from 1 to 3, inclusive.

The term "lower-alkyl" as used throughout the specification and claims means alkyl having from 1 to 8 carbon atoms, inclusive, such as methyl, ethyl, propyl, butyl, pentyl, hexyl, heptyl, octyl, and isomeric forms thereof. The term "lower-isocyanatoalkyl" as used throughout the specification and claims means a lower alkyl group as defined above which is substituted by isocyanato. Examples of lower-isocyanatoalkyl are isocyanatomethyl, 2-isocyanatoethyl, 2-isocyanatopropyl, 4-isocyanatobutyl, 4-isocyanatohexyl, 5-isocyanatooctyl, and the like. The term "lower-alkylene" as used throughout the specification and claims means branched or straight chain alkylene having from 1 to 6 carbon atoms inclusive, such as methylene, ethylene, trimethylene, 1,4-butylene, 1,2-propylene, 1,3-hexylene, 1,4-octylene, 1,8-octylene, 2,2-dimethyl-1,4-butylene and the like. The term "arylene" as used throughout the specification and claims means a divalent residue of an aromatic hydrocarbon, preferably one having from 6 to 12 carbon atoms, inclusive, such as phenylene, tolylene, xylylene, naphthylene, diphenylylene, and the like. The term "lower-alkoxycarbonyl" as used throughout the specification and claims means the group —COOAlkyl wherein Alkyl represents lower-alkyl as hereinbefore defined.

The term "free radical source" is used throughout the specification and claims as having the meaning recognized in the art; see, for example, Sosnovsky, Free Radical Reactions in Preparative Organic Chemistry, 1964, pp. 1 to 5, Macmillan, New York. Illustrative free radical sources are azonitriles such as 2,2′-azobis(2-methylpropionitrile), 2,2′-azobis(2-methylbutyronitrile), 2,2′-azobis (2-methylhexanenitrile), and the like; peroxides such as di-t-butylperoxide, benzoyl peroxide and the like, hydroperoxides such as t-butyl hydroperoxide cumene hydroperoxide, and the like; peresters such as t-butyl peracetate, t-butylperbenzoate, t-butyl perphthalate, and the like; and light sources advantageously within the range of 2500 to 6000 Angstrom units. Sources of ultraviolet light or near-ultraviolet light are the preferred light sources.

In carrying out the process of the invention the reactants are brought together in any order. The proportions of reactants employed are generally at least 1 mole and preferably more of the haloalkane (II) per mole of the olefinic isocyanate for producing 1:1 molar adducts. In many instances, depending on the reactivity of the haloalkane (II), the proportion of the latter employed has a significant effect on the degree of telomerization which occurs in the process of the invention. Thus, the principal reaction taking place in the process of the invention is the addition of the haloalkane (II) across the double bond of the unsaturated compound (I). A competing reaction which can occur, particularly in the case where R in compound (I) represents hydrogen, is that of telomerization i.e. condensation of two or more molecules of the compound (I) to form dimers, trimers, etc., with simultaneous addition of the haloalkane across the ends of the polymer chain to form mixtures of compounds having the Formula III above in which $x$ is 2, 3, or even higher, which products are commonly known as telomers.

Where the haloalkane (II) is a highly reactive compound such as carbon tetrabromide, bromotrichloromethane, dibromodichloromethane, and the like the degree of telomerization occurring in the process of the invention is low. Using reactive compounds of the above type the principal product is the corresponding compound (III) in which $x=1$, even when the haloalkane (II) is employed in the reaction mixture in an amount only slightly in excess of the equimolar proportion with respect to the unsaturated compound (I).

In the case of haloalkanes (II) of lower reactivity than those named above, the degree of telomerization is higher and a significant amount of the product (III) in which $x$ is 2, 3, or higher will be produced if the haloalkane (II) is employed in approximately equimolar proportions. The degree of telomerization can be reduced by employing the haloalkane (II) in excess of equimolar proportions. Thus, by employing the haloalkane (II) in an amount of at least twice and preferably of the order of 4 to 6 times the equimolar proportions based on unsaturated compound (I) the telomerization can be reduced to a minium or eliminated entirely so that the principal product isolated from the reaction is the compound (III) wherein $x$ is 1.

Where one or both of the reactants (I) and (II) are liquid it is generally found to be unnecessary to employ an inert solvent in the process of the invention. When the haloalkane (II) is a liquid it is frequently convenient to employ an excess of this material (i.e. excess over the stoichiometric proportion based on compound (I) to serve the double purpose of acting as solvent for the reaction and suppressing the formation of telomers. However, inert solvents i.e. solvents which do not take part in the reaction under the conditions employed in the process of the invention, can be employed if desired. Illustrative of such solvents are benzene, toluene, xylene, petroleum ether, hexane, pentane, octane and the like.

The free radical source, when a chemical source is employed, can be added to the mixture of reactants (I) and (II) either in one single addition at the start of the reaction or preferably portionwise as the reaction proceeds. The total amount of chemical free radical source employed whether in one single addition or by multiple additions is generally of the order of about 0.001 mole to about 0.1 mole per mole of the compound (I) and is preferably of the order of about 0.01 mole to about 0.05 mole per mole of the compound (I). When light is employed as free radical source the irradiation of the reaction mixture is generally maintained continuously throughout the course of the reaction in accordance with conventional procedures for such reactions.

The temperature at which the reaction is carried out at a reasonably convenient rate varies according to the free radical source employed. When light, particularly ultraviolet light, is employed as free radical source, the reaction can be carried out advantageously at temperatures of the order of about 0° C. to about 100° C. and preferably at about 25° C. Where azo compounds or peroxides are employed as free radical sources a reaction temperature between about 60° C. and 100° C., at least in the initial stages, is generally convenient. When the free radical source is a hydroperoxide somewhat higher reaction temperatures, of the order of about 100° C. to about 150° C. are generally satisfactory. The exact choice of temperature is one which can readily be determined by trial procedures as will be apparent to one skilled in the art.

The reaction between the compounds (I) and (II) generally takes of the order of fractions of an hour to several hours to attain completion depending upon the particular reactants and free radical sources employed. The progress of the reaction can be followed by conventional procedures, advantageously by spectral analysis to determine the point at which absorption bands corresponding to the double bond in reactant (I) disappear.

The desired product (III) can be isolated from the reaction mixture by conventional procedures. For example the excess of haloalkane (II) and any inert solvent which has been employed can be removed by distillation when the haloalkane has the necessary volatility. The residual compound (III) can be purified, if desired, by conventional procedures such as recrystallization from suitable solvents in the case of a solid, distillation in the case of a liquid, chromatography, counter-current distribution and the like. When the compound (III) is a mixture, for example, when telomerization has occurred during the process of the invention, said mixture can be separated, if desired, into its component parts by conventional techniques such as chromatography, counter-current distribution and the like, or any combination thereof.

The compounds having the Formula III which are produced by the process of the invention are novel compounds. Said compounds, including mixtures of said compounds in which $x$ has a value of 1, 2, 3, or higher, are useful as intermediates in the preparation of fire retardant polyurethanes. For this purpose the monoisocyanates of Formula III can be incorporated as additives in the reaction mixture conventionally employed to prepare polyurethanes, and where the compounds of Formula III are di- or polyisocyanates they can be employed to replace a part or the whole of the polyisocyanate normally employed to replace a part or the whole of the polyisocyanate normally employed in the preparation of polyurethanes.

In addition to their use as fire retardants in the preperation of polyurethanes the compounds of the invention having the Formula III are also useful as compounds which can be employed in the fire-proofing of cellulosic material, either synthetic or derived from natural fibre, such as paper, cotton, rayon, cellulose, and the like. Such fire-proofing can be accomplished by treatment of fibers prior to fabricating end-products such as sheet material, clothing, upholstery, and the like or by treatment of the end-products themselves. The isocyanates of Formula III and the cellulosic material to be treated are reacted in the presence of a catalyst such as a tertiary amine, for example, triethylamine, triethanolamine, triethylenediamine and the like. Advantageously, the isocyanate is employed as a solution thereof in an inert solvent such as benzene, toluene, xylene, hexane, petroleum ether and the like. The isocyanate reacts with the free hydroxyl groups in the cellulosic material and becomes incorporated therein. The reaction can be carried out at room temperature or higher, for example at temperatures of the order of about 25° C. up to about 100° C. or the reflux temperature of the inert solvent solution employed, whichever is higher. At the completion of reaction the inert solvent is removed, advantageously under reduced pressure. The amount of isocyanate (III) which is employed in the treatment of cellulosic material in this manner is advantageously of the order of about 2% to about 15% by weight of cellulosic material.

The compounds of Formulae I and II which are employed as starting materials in the process of the invention are known compounds which can be prepared by procedures well-known in the art.

The following examples describe the manner and process of making and using the invention and set forth the best mode contemplated by the inventors of carrying out the invention but are not to be construed as limiting.

EXAMPLE 1

4,4,4-trichloro-2-bromobutyl isocyanate

A mixture of 20 g. (0.238 mole) of allyl isocyanate, 200 g. (1.0 mole) of bromotrichloromethane and 1 g. (0.0061 mole) of 2,2′-azobis(2-methylpropionitrile) was heated under reflux on a steam bath for 3 hours. At the end of this period the excess bromotrichloromethane was removed by distillation under reduced pressure. The residue (69.68 g.) was an orange colored liquid and a portion (29.38 g.) thereof was distilled under vacuum. The fraction having a boiling point of 92 to 94° C. at 0.5 to 0.6 mm. of mercury was collected. There was thus obtained 4,4,4-trichloro-2-bromobutyl isocyanate in the form of a colorless liquid; $n_D^{22}$ 1.5269.

*Analysis.*—Calculated for $C_5H_5ONBrCl_3$ (percent): C, 21.38; H, 1.67; Cl, 37.85. Found (percent): C, 21.55; H, 1.59; Cl, 37.53.

The above material was further characterized by conversion, using an excess of methanol in accordance with conventional procedures, to the corresponding methyl carbamate having a melting point of 64 to 65.50 C.

*Analysis.*—Calcd. for $C_6H_8O_2NCl_3Br$ (percent): C, 23.0; H, 2.9; N, 4.47; Cl, 34.0. Found (percent): C, 22.81; H, 2.73; N, 4.54; Cl, 33.77.

EXAMPLE 2

2,4-dibromo-4,4-dichlorobutyl isocyanate

Using the procedure described in Example 1, but replacing bromotrichloromethane by dibromodichloromethane, there is obtained 2,4-dibromo-4,4-dichlorobutyl isocyanate.

EXAMPLE 3

2,4,4-tribromo-4-chlorobutyl isocyanate

Using the procedure described in Example 1, but replacing bromotrichloromethane by tribromochloromethane, there is obtained 2,4,4-tribromo-4-chlorobutyl isocyanate.

EXAMPLE 4

2,4,4,4-tetrabromobutyl isocyanate

Using the procedure described in Example 1, but replacing bromotrichloromethane by carbon tetrabromide, there is obtained 2,4,4,4-tetrabromobutyl isocyanate.

EXAMPLE 5

2,4-dibromo-4,4-dicarbethoxybutyl isocyanate

Using the procedure described in Example 1, but replacing bromotrichloromethane by diethyl dibromomalonate, there is obtained 2,4-dibromo-4,4-dicarbethoxybutyl isocyanate.

EXAMPLE 6

2-bromo-4-chloro-4,4-dicarbethoxybutyl isocyanate

Using the procedure described in Example 1, but replacing bromotrichloromethane by diethyl bromochloromalonate, there is obtained 2-bromo-4-chloro-4,4-dicarbethoxybutyl isocyanate.

EXAMPLE 7

2,4,4-tribromo-4-carbethoxybutyl isocyanate

Using the procedure described in Example 1, but replacing bromotrichloromethane by ethyl tribromoacetate, there is obtained 2,4,4-tribromo-4-carbethoxybutyl isocyanate.

EXAMPLE 8

2-bromo-4,4-dichloro-4-carbethoxybutyl isocyanate

Using the procedure described in Example 1, but replacing bromotrichloromethane by ethyl bromodichloroacetate, there is obtained 2-bromo-4,4-dichloro-4-carbethoxybutyl isocyanate.

EXAMPLE 9

2,4-dibromo-4-4carbethoxy-4-cyanobutyl isocyanate

Using the procedure described in Example 1, but replacing bromotrichloromethane by ethyl dibromocyanoacetate, there is obtained 2,4-dibromo-4-carbethoxy-4-cyanobutyl isocyanate.

EXAMPLE 10

2-4-dibromo-4,4-dicyanobutyl isocyanate

Using the procedure described in Example 1, but replacing bromotrichloromethane by dibromomalononitrile, there is obtained 2,4-di-bromo-4,4-dicyanobutyl isocyanate.

EXAMPLE 11

4-(1-bromo-3,3,3-trichloropropyl)phenyl isocyanate

Using the procedure described in Example 1, but replacing allyl isocyanate by 4-vinylphenyl isocyanate, there is obtained 4-(1-bromo-3,3,3-trichloropropyl) phenyl isocyanate.

Similarly, using the procedure described in Example 1, but replacing allyl isocyanate by 3-vinylphenyl isocyanate and 2-methyl-5-vinylphenyl isocyanate, there are obtained 3-(1-bromo-3,3,3-trichloropropyl)phenyl isocyanate and 2-methyl-5-(1-bromo-3,3,3-trichloropropyl)phenyl isocyanate, respectively.

EXAMPLE 12

1-bromo-2-trichloromethylbutane-1,4-diisocyanate

Using the procedure described in Example 1, but replacing allyl isocyanate by 1-butene-1,4-diisocyanate, there is obtained 1-bromo-2-trichloromethylbutane-1,4-diisocyanate.

EXAMPLE 13

1-bromo-2-trichloromethylethane-1,2-diisocyanate

Using the procedure described in Example 1, but replacing allyl isocyanate by ethene-1,2-diisocyanate, there is obtained 1-bromo-2-trichloromethylethane-1,2-diisocyanate.

EXAMPLE 14

4,4,4,-trichloro-2-bromobutyl isocyanate

Using the procedure described in Example 1, but replacing bromotrichloroethane by trichloromethanesulfonyl bromide, there is obtained 4,4,4-trichloro-2-bromobutyl isocyanate.

EXAMPLE 15

A sample of cotton batting was rendered fire retardant using the following procedure.

A 2 g. sample of cotton batting was treated to remove absorbed moisture by immersing it successively in aqueous acetone containing 96% v./v. of acetone, a mixture of equal parts of acetone and toluene, and finally in toluene. The sample so treated was then suspended in a solution containing 3.084 g. of 4,4,4-trichloro-2-bromobutyl isocyanate and 0.3 g. of triethylenediamine in 250 ml. of toluene and the mixture was heated under reflux for 2 hours. At the end of this time, the mixture was cooled and the cotton sample was removed therefrom and freed from excess reaction mixture by gentle squeezing followed by dipping (with gentle squeezing) in successive baths containing equal parts of toluene and acetone and then acetone containing 2% by volume of water to restore the original water content. The cotton sample was finally rinsed quickly with 100% acetone, dried roughly between filter paper and finally by air drying. The dried sample was found to weigh 2.25 g. A second 2 g. sample of cotton batting was treated with solvents exactly as described above except that the solution containing 4,4,4-trichloro-2-bromobutyl isocyanate and triethylenediamine was omitted. This sample formed the control sample. The two samples were then ignited with a flame under identical conditions. The control sample was completely combusted in 9 seconds. 0.1 g. of the treated sample burned for 17 seconds before combustion ceased and a large proportion, about 30% by weight, of material remained as an incompletely combusted mass (residue weight=0.003 g.).

What we claims is:

1. A process for rendering a cellulosic material fire retardant which comprises reacting said cellulosic material with from about 2% to about 15% by weight, based on cellulosic material, of a halogenated isocyanate having the formula:

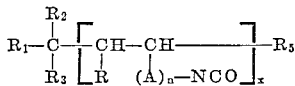

wherein R is selected from the group consisting of hydrogen, alkyl from 1 to 8 carbon atoms, inclusive, and isocyanatoalkyl from 1 to 8 carbon atoms, inclusive, $R_1$ and $R_5$ are each selected from the group consisting of chlorine and bromine, $R_2$ and $R_3$ are each selected from the group consisting of chlorine, bromine, cyano, and —COO—Alkyl wherein alkyl has from 1 to 8 carbon atoms, inclusive, A is a divalent radical selected from the group consisting of alkylene from 1 to 6 carbon atoms, inclusive, and arylene from 6 to 12 carbon atoms, inclusive, $n$ is an integer from 0 to 1 and $x$ is an integer from 1 to 3, inclusive.

2. The process of claim 1 wherein the halogenated isocyanate is 4,4,4-trichloro-2-bromobutyl isocyanate.

3. A process for rendering cotton fire retardant which comprises reacting said cotton with from 2% to about 15% by weight, based on cotton, of a halogenated isocyanate having the formula:

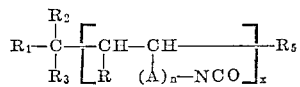

wherein R is selected from the group consisting of hydrogen, alkyl from 1 to 8 carbon atoms, inclusive, and isocyanatoalkyl from 1 to 8 carbon atoms, inclusive, $R_1$ and $R_5$ are each selected from the group consisting of chlorine and bromine, $R_2$ and $R_3$ are each selected from the group consisting of chlorine, bromine, cyano, and —COOAlkyl wherein alkyl has from 1 to 8 carbon atoms, inclusive, A is a divalent radical selected from the group consisting of alkylene from 1 to 6 carbon atoms, inclusive, and arylene from 6 to 12 carbon atoms, inclusive, $n$ is an integer from 0 to 1 and $x$ is an integer from 1 to 3, inclusive.

4. The process of claim 3 wherein the halogenated isocyanate is 4,4,4-trichloro-2-bromobutyl isocyanate.

References Cited

UNITED STATES PATENTS

| | | | |
|---|---|---|---|
| 3,233,962 | 2/1966 | Nelson | 260—212 |
| 3,311,608 | 3/1967 | Murphy | 260—212 |
| 3,422,075 | 1/1969 | Taylor | 260—212 |
| 3,437,680 | 4/1969 | Farrissey et al. | 260—453 |

DONALD E. CZAJA, Primary Examiner

R. W. GRIFFIN, Assistant Examiner

U.S. Cl. X.R.

8—116.2; 106—15; 252—8.1